3,651,114
PRODUCTION OF ORGANO ALUMINUM
COMPOUNDS
Hoyt J. Cragg and Kenneth L. Lindsay, Baton Rouge,
La., assignors to Ethyl Corporation, New York, N.Y.
No Drawing. Filed Nov. 28, 1969, Ser. No. 880,888
Int. Cl. C07f 5/06
U.S. Cl. 260—448 A                                      9 Claims

ABSTRACT OF THE DISCLOSURE

Improvements in reactions for producing organo aluminum compounds are described. The improvements involve control of the proportions of reactants fed for reactions involving aluminum, olefin and hydrogen in the presence of an organo aluminum compound. It is disclosed that significantly increased reaction rates are obtained when olefin and hydrogen are fed at a ratio substantially higher than the 2:1 molar ratio taught as suitable or even unimportant by much of the prior art.

BACKGROUND OF THE INVENTION

Field of the invention

The invention relates generally to the manufacture of trialkyl aluminum compounds. Typical compounds are triethyl aluminum, triisobutyl aluminum, tri-n-hexyl aluminum, and tri-n-octyl aluminum.

Processes of the general nature of the present invention are disclosed in U.S. Pats. 2,787,626; 2,900,402; 2,930,808; 3,000,919; 3,016,396; 3,032,574; 3,100,786; 3,104,252; 3,207,770; 3,207,772; 3,207,773; 3,207,774.

Description of the prior art

Reactions of the foregoing prior art are, in general, placed in two categories depending upon the manner of feed of the reactants and the control of conditions. In one category, the reactions are performed in two sequential stoichiometric reaction steps in which the feeding of hydrogen and olefin reactants is separated. For this operation, it is necessary to have an organo aluminum compound initially present as a starting reactant in at least stoichiometric proportions for the production of the dialkyl aluminum hydride.

On the other hand, a reaction arrangement preferred in many instances is a joint feed arrangement wherein the olefin and hydrogen reactants are caused to be present in the reaction environment coincidentally under favorable conditions so that olefin molecules can add to the aluminum-H bonds formed in the reaction to concurrently produce trialkyl aluminum compounds, thereby changing any dialkyl aluminum hydride intermediates produced to influence favorably various equilibria and avoid the need for stoichiometric initial feed of trialkyl aluminum compound reactant. It is to this latter category of reaction arrangement that the present invention pertains. Usually this involves a "co-feed" or "joint-feed" period; however, in some instances a "joint presence" is more descriptive in that the requirement even for the overall reaction is merely for additional olefin feed.

Where hydrogen and olefin are fed separately, it has been customary to emphasize two different reactions typified for ethyl aluminum compounds as follows:

$$Al + 3/2H_2 + 2Al(C_2H_5)_3 \rightarrow 3Al(C_2H_5)_2H$$

$$3Al(C_2H_5)_2H + 3C_2H_4 \rightarrow 3Al(C_2H_5)_3$$

Once these two reactions are presented separately, it is then conventional to refer to the overall stoichiometric effect of the two reactions as being to produce 3 mols of triethyl aluminum for each two mols of triethyl aluminum initially present (using an overall feed ratio of 1 molecule of hydrogen per two molecules of olefin.

When one translates the foregoing two reactions into a joint-feed type of reaction wherein hydrogen and olefin are present concurrently during at least a substantial portion of the reaction time, it is not unusual to think in terms of the following overall reaction.

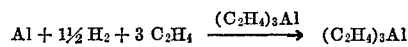

As this reaction is shown, there is no requirement for triethyl aluminum as a stoichiometric starting reactant. Also it is shown by the equation that hydrogen and olefin are reacted in the ratio of 1 mol of hydrogen per 2 mols of olefin leading to the long standing prior practice as summarized in numerous patents, typically 3,100,786 and 3,259,644, for a feed of the materials in the ratio of 2 molecules of olefin per molecule of hydrogen, or less.

The precise manner of joint feed of the reactants is subject to considerable variation in the prior art with many references placing an emphasis on an aluminum activation or induction period in which hydrogen is fed with or without olefin followed by a prolonged reacting period in which the pressure is maintained either by the feed of additional hydrogen as discussed in U.S. Pat. 3,100,786 or by an intermittent or continuous joint feed of the olefin and hydrogen in the 2:1 molar ratio discussed.

SUMMARY OF THE INVENTION

In accordance with the present invention, organo aluminum compounds are produced by reacting aluminum, hydrogen and olefin in the presence of an organo aluminum compound. In particular, the invention relates to an improvement in that reaction wherein the hydrogen and the olefin feeds are proportioned so as to maintain an olefin to hydrogen molar feed ratio more than 10 percent higher than 2:1. Ratios are based on one reactive olefinic site per molecule of olefin. For olefinic material having different numbers of reactive sites per molecule, appropriate adjustments are made.

The most preferred feed ratios are based on the following relationships.

(1) For triethyl aluminum $$\text{Mol ratio } \frac{\text{ethylene}}{\text{hydrogen}} = \frac{2}{1-[0.201 \times 10^{-3} P]}$$

(Formula I)

where: P signifies partial pressure of hydrogen in reaction environment (p.s.i.a.) (pounds per square inch absolute)

(2) For higher normal alkyl (straight chain, primary carbon atom linked to aluminum having 3–30 carbon atoms per alkyl group) organo aluminums (butyl, hexyl, etc.)

$$\text{Mol ratio } \frac{\text{olefin}}{\text{hydrogen}} = \frac{2}{1-\left[0.201 \times 10^{-3} \left(\frac{M}{114}\right) P\right]}$$

(Formula II)

where:
P signifies as in the foregoing.
M signifies molecular weight of trialkyl aluminum product.

The olefin feed is vinyl olefin having 3–30 carbon atoms per molecule.

(3) For triisobutyl aluminum $$\text{Mol ratio } \frac{\text{isobutylene}}{\text{hydrogen}} = \frac{2}{1-[0.413 \times 10^{-3} P]}$$

(Formula III)

where: P signifies as in the foregoing.

(4) For higher branched, cyclic, etc. organo aluminum having 5–30 carbon atoms per alkyl group.

$$\text{Mol ratio } \frac{\text{olefinic material}}{\text{hydrogen}} = \frac{2}{1-\left[0.413 \times 10^{-3} \left(\frac{M}{198}\right) P\right]}$$

(Formula IV)

where: M and P are as in the foregoing and the olefin feed is branched, cyclic, etc. as herein defined having up to about 30 carbon atoms per molecule.

(5) A generalized relationship for all organo aluminum compounds having 2–30 carbon atoms per organo or hydrocarbon radical and the olefin molecule is as follows:

$$\text{Mol ratio } \frac{\text{olefinic material}}{\text{hydrogen}} = \frac{2}{1-\left[\frac{2MP}{3dRT}\right]}$$

(Formula V)

where:
P = partial pressure of $H_2$ (p.s.i.a.).
T = temperature (° K.)
M = molecular weight of aluminum trialkyl product, gr./mole
d = density of aluminum trialkyl product, grams/milliliter
R = gas constant = 1209.8 p.s.i.g.-ml./° K.-mol In practice, the advantages are realized over a limited range of ratios extending from about 10 percent below the most preferred ratio in each instance up to about 10 percent above the most preferred ratio in each instance. A narrower preferred range for each ratio is ±5 percent of that specified by the relationships.

The following factors (Table I), calculated at 140° C., are in practice usable over the temperature range 120–160° C.

TABLE I

| Material | Density | $2M/3dRT/$ (approximate)* |
|---|---|---|
| $Et_3Al$ | 0.755 | $0.201 \times 10^{-3}$ |
| $i-Bu_3Al$ | 0.639 | $0.413 \times 10^{-3}$ |
| $n-Hex_3Al$ | 0.761 | $0.494 \times 10^{-3}$ |

*Exact at 140° C.

As a first approximation for the factor $2M/3dRT$ for a given material, the product of d times T constant over the preferred temperature range of 120–160° C. may be assumed. The error thus introduced is only ±0.8 percent for $Et_3Al$, ±1.2 percent for $i-Bu_3Al$, and ±2.7 percent for $n-Hex_3Al$, as can be seen from Table II below.

TABLE II.—OLEFIN/$H_2$ Co-FEED RATIO (MOLAR)

| Hydroalumination product | Temp., °C. | Olefin/$H_2$ Co-feed ratio | | |
|---|---|---|---|---|
| | | 600 p.s.i.g. | 1,000 p.s.i.g. | 2,000 p.s.i.g. |
| $Et_3Al$ | 120 | 2.29 | 2.53 | 3.44 |
| | 130 | 2.29 | 2.52 | 3.40 |
| | 140 | 2.28 | 2.51 | 3.37 |
| | 150 | 2.28 | 2.50 | 3.33 |
| | 160 | 2.27 | 2.49 | 3.30 |
| $i-Bu_3Al$ | 120 | 2.67 | 3.41 | 11.17 |
| | 130 | 2.66 | 3.39 | 10.74 |
| | 140 | 2.65 | 3.37 | 10.38 |
| | 150 | 2.65 | 3.35 | 10.02 |
| | 160 | 2.64 | 3.33 | 9.71 |
| $n-Hex_3Al$ | 120 | 2.92 | 4.15 | *∞ |
| | 130 | 2.89 | 4.08 | *∞ |
| | 140 | 2.87 | 4.01 | 428.6 |
| | 150 | 2.85 | 3.95 | 106.27 |
| | 160 | 2.84 | 3.90 | 59.21 |

*Ratios of infinity signify a "point presence" situation which does not require the feed of additional hydrogen since residual hydrogen is adequate for the overall reaction.

It has been found that the use of the customary prior art two-to-one olefin-to-hydrogen feed ratio results in a deficiency of olefin reactant and an actual gradual reduction in reaction rate. This reduction in rate is generally so substantial that it has heretofore been commonplace to terminate batch reactions before the entire volume of the reactor is occupied by liquid trialkyl aluminum product, reducing the volume of product per batch and increasing costs. The foregoing situation is adverse enough in instances where the 2:1 olefin to hydrogen feed ratio is maintained; however, it is even more adverse in those situations where one seeks to maintain a high reaction pressure by periodic pressuring with only hydrogen, a procedure commonplace in the art.

The reaction condition considerations with respect to other variables such as temperature and pressure and type and size of aluminum used are in general the same as in the prior art with the exception that higher reaction rates of the present process permit somewhat milder physical conditions if desired providing better control of side reactions and also permit the use of less reactive forms and sizes of aluminum that may provide advantages from an availability or cost viewpoint.

In general, the principles of the present application find particularly high utility in instances where the organo aluminum products are of comparatively high molecular weight such as trioctyl aluminum or tridecyl aluminum or are even higher molecular weight organo aluminum compounds. On the other hand, the present invention has significant utility in the production of ethyl aluminum compounds and finds an extremely high measure of utility in the production of butyl and hexyl aluminum compounds.

Any suitable olefinic hydrocarbon is employed in the preparation of organo aluminum compounds in accordance with the present invention. Suitable olefinic hydrocarbons are the straight and branched chain aliphatic monoolefins, including 1,1-dialkylated ethylenes, cyclic olefins, alicyclic olefins, corresponding diolefins and aryl olefins. Examples are: ethylene, propylene, butene-1, butene-2, isobutylene, pentene-1, pentene-2, hexene-1, 2-methyl pentene-1, mixed heptenes obtained by the copolymerization of other olefins such as propylenes and butylenes in the presence of a phosphoric acid catalyst, octene-1, octene-2, octene-3, 2-ethyl hexene-1, diisobutylene, dodecene-1, hexadecene-1, eicosene-1, triacontene-1, tetradecene-4, 2-ethyl butene-1, 3-ethyl octene-1, 2-ethyl hexene-1, and the like.

Other examples are cyclopentene, cyclohexene, methylene cyclopentene, methylene cyclohexene and vinyl cyclohexene. Other examples are styrene, fulvene, and their alkyl derivatives such as alpha-methyl styrene, 6-phenyl hexene-1, 5-phenyl pentene-1, 12-phenyl dodecene-1, and the like. Other examples are piperylene, 1,4-hexadiene, limonene, camphene, and 2,6-dimethyl-2,7-octadiene.

The aluminum compounds used as reactants or presence compounds in the process contain at least two hydrocarbon radicals per aluminum atom and each radical contains from 2 to about 30 carbon atoms. Thus two general groups of reactants may be employed; that is, dihydrocarbon aluminum hydrides ($R_2AlH$) and trihydrocarbo aluminum compounds ($R_3Al$) where each R is a hydrocarbon group of 2 to about 30 carbon atoms. The hydrocarbon groups present in these reactants may vary and include alkyl, cycloalkyl, alkenyl, aryl, aralkyl, alkaryl, cycloalkenyl, alkynyl and like hydrocarbon radicals and they may have similar or different carbon skeletons in relationship to the starting olefins. Thus, use may be made of such compounds as dioctyl aluminum hydride, trioctadecyl aluminum, dicyclohexyl aluminum hydride, tris-(dimethylcyclohexyl) aluminum, trivinyl aluminum, trioctenyl aluminum, diphenyl aluminum hydride, triphenyl aluminum, ditolyl aluminum hydride, trixylyl aluminum, tribenzyl aluminum, tris-(2-phenethyl) aluminum, tricumenyl aluminum, tris-(4-cyclohexenyl) aluminum, triheptynyl aluminum, tris-triacontyl aluminum, tricitronellyl aluminum, and the like including mixed alkyl aluminum systems such as those produced by ethylene chain growth or polymerization. Generally speaking, it is preferable from the standpoint of availability and ease of manufacture to employ dialkyl aluminum hydrides and trialkyl aluminum compounds as the reactants, especially those containing 2 to about 20 carbon atoms in each alkyl group. Furthermore, from the viewpoints of maximum aluminum content of end product on a weight basis and ease of synthesis, the use as reactants or co-presence materials of dialkyl aluminum hydrides and trialkyl aluminum compounds having alkyl groups of 2 to 6 carbon atoms and olefins or similar carbon skeletons is especially preferred. Exemplary alkyl compounds are diethyl aluminum hydride, triethyl aluminum, tripropyl aluminum, tri-n-butyl aluminum, triisobutyl aluminum, diisobutyl aluminum hydride, trihexyl aluminum, dihexyl aluminum hydride and the like. These are preferably used with olefins of similar carbon skeletons such as triethyl aluminum with ethylene, triisobutyl aluminum with isobutene, tri-n-hexyl aluminum with hexene-1, and so forth to produce tri (similar alkyl) alkyl aluminum compounds.

The products of the process are, in general, triorgano aluminum compounds preferably trialkyl aluminum compounds as characterized by the aforementioned reactants.

It is desirable to provide ample agitation or turbulence in the reaction system to insure thorough mixing of the reactants and intimate contact between the various phases of materials involved. If desired, suitable anhydrous solvents which do not adversely affect the desired reaction may be employed. Exemplary of such solvents are saturated aliphatic hydrocarbons (for example, paraffinic hydrocarbons, cycloparaffinic hydrocarbons, or mixtures thereof), aromatic hydrocarbons, saturated fluorocarbons, silicone oils. Also included as suitable liquid solvent is the organo aluminum product that is to be prepared by the present reaction. Thus, in some instances it is practical to employ what might appear to be stoichiometric or even greater proportions of organo aluminum compounds from the start of the reaction. An advantage of using the product organo aluminum compound is that it avoids the problem of recovery of the product from solvents. In many instances, the olefinic hydrocarbon reactant is liquid under the reaction conditions employed; however, this does not preclude the use of additional solvent materials even in those instances. In some instances it is advantageous to make use of complexation of the product or reactant materials with tertiary amines, such as trimethyl amine, ethers such as diethyl ether, dioxane, tetrahydrofuran and, in general, various non-reactive basic materials.

Typical solvents, therefore, are pentane, hexane, cyclohexane, heptane, octane, benzene, toluene, xylene, and like saturated aliphatic hydrocarbons and aromatic hydrocarbons, individually and in various mixtures and isomers.

Whenever possible, one prefers to dispense with the use of ancillary solvents in addition to the reactants or products to minimize recovery problems and avoid the need for provision for larger reactors to accommodate the solvent materials.

For best results, clean, essentially anhydrous, particulate aluminum of the makeup described herein is employed. Inasmuch as the reaction should be conducted in an essentially anhydrous environment, it is desirable to insure that the aluminum fed to the process is itself free from excessive moisture. In addition, the aluminum should be essentially free from any oily residue, dirt, soil or extraneous contaminants which would tend to interfere with intimate contact between the aluminum and other reactants being used.

Although the size of the particulate aluminum is not critical, it is generally desirable that the particles range in size from fine particles up to about 4 mesh. Typical atomized aluminum powders have average diameters of 9 microns, 25 microns, and 30 microns. Such small particles enable the achievement of rapid reaction rates. It will be understood and appreciated, however, that the extent of subdivision of the aluminum is not critical and, in accordance with known principles, other materials having smaller surface area than the finer particles typified are usable for reaction and, in general, will result in predictably slower overall reaction rates.

Ordinary commercial virgin aluminum and scrap aluminum, particularly casting and aircraft grades, in various forms such as turnings, fillings, shavings, chips or powder are suitable for use in the present invention. In some instances, if the aluminum has been purified to an excessive extent, either originally or in scrap recovery operations, the back-addition of conventional impurities as mentioned in U.S. Pat. 3,104,252 or British Pat. 1,044,735 may provide increased reaction rates.

The organo aluminum compounds which can be prepared by the process of this invention are of known utility as ingredients for polymerization catalysts and as chemical intermediates in the production of olefins, alcohols, and other valuable products. For further details, reference may be had to the patent literature, including the disclosures of the U.S. patents cited in the foregoing.

In conducting the present reaction, conventional pressures ranging from about 500 p.s.i. to about 5000 p.s.i. are usable with pressures ranging from about 600 to about 1000 p.s.i.g. being more preferred, typical pressures being 600 p.s.i.g., 750 p.s.i.g., 1000 p.s.i.g., 1500 p.s.i.g. and 2000 ps.i.g. It is readily appreciated by those skilled in the art that the precise pressures involved will vary somewhat depending upon the speed of agitation and the reactivity of the aluminum (i.e., its trace metal composition and particle size).

Reaction temperatures range generally from about 100° to about 250° C., a preferred range being from about 120 to about 160° C. Typical temperatures are 125° C., 135° C., 145° C. and 160° C.

Various forms of activation or catalysis of the invention may be used. One typical form of activation is with an alkali or alkaline earth metal in the reaction environment as taught in U.S. Pat. 3,100,786.

Other forms of activation useful independently or concurrently with other procedures depending upon the particular type of materials involved include mechanical grinding to remove surface contamination of aluminum such as oxide films as described in U.S. Pat. 3,207,770.

EXAMPLE I

A 300-ml. stirred "Magne-Drive" autoclave was charged with 40 g. of powdered Al, 0.3 g. Na, and 20 ml. of (i-Bu)$_3$Al and purged with hydrogen. The reactor was heated to 140° C. and pressured to 1000 p.s.i.g. with hydrogen. The isobutylene and hydrogen were metered to the reactor in a 3.33 molar ratio at such a rate as to maintain the pressure constant. A total of 96 ml. of isobutylene (measured as a liquid at ambient temperature in a pressure buret) was consumed in 46 minutes. The average rate of consumption of isobutylene during the major portion of the reaction period was 3.12 ml./min.

Product triisobutyl aluminum was recovered.

EXAMPLE II

For a comparison, Example I was repeated with an olefin/hydrogen feed ratio of 2:1. The consumption of isobutylene was 49 ml. in 3 hours and 47 minutes. The average rate of consumption of isobutylene was 0.15 ml./minute.

Example I represents a 12.5-fold increase in the rate of hydrogen consumption during the major portion of the reaction period $$\left(\frac{3.12}{0.15} \times \frac{2.0}{3.33} = 12.5\right)$$

and a 5.8-fold increase in rate of hydrogen consumption over the total reaction period $$\left(\frac{96}{46} \times \frac{227}{49} \times \frac{2.0}{3.33} = 5.8\right)$$

EXAMPLE III

Example I is repeated at temperatures ranging from 120–160° C. and pressures ranging from 600 p.s.i.g. to 2000 p.s.i.g., using isobutylene/hydrogen molar feed ratios selected from Table II and representing a ±10 percent variation from the ratios provided by the formulas. Rates of hydrogen and isobutylene uptake in each case are substantially greater than in otherwise comparable runs using a 2:1 molar feed ratio.

EXAMPLE IV

A 300-ml. stirred "Magne-Drive" autoclave was charged with 27 g. powdered Al, 0.4 g. Na, and 33 ml. (28 g.) of tri-n-hexylaluminum. The reactor was heated to 140° C. and pressured with 1000 p.s.i.g. hydrogen. Then 1-hexene and hydrogen were fed in a 4:1 molar ratio so as to maintain the pressure constant at 1000 p.s.i.g. A total of 105 ml. of 1-hexene was fed in 37 min.

Product tri-n-hexylaluminum was recovered.

EXAMPLE V

For a comparison, Example IV was repeated with an olefin/hydrogen feed ratio of 2:1. A total of 92 ml. of 1-hexene was fed in 3 hours and 38 minutes.

Example IV represents a 3.3-fold increase in rate of hydrogen consumption $$\left(\frac{105}{37} \times \frac{218}{92} \times \frac{2.0}{4.0} = 3.36\right)$$

EXAMPLE VI

Example IV is repeated at temperatures ranging from 120–160° C. and pressures ranging from 600 p.s.i.g. to 2000 p.s.i.g. using 1-hexene/hydrogen molar feed ratios selected from Table II and representing a ±10 percent variation from the ratios provided by the formulas. Rates of hydrogen and 1-hexene uptake in each case are substantially greater than in otherwise comparable runs using a 2:1 molar feed ratio.

EXAMPLE VII

Example I is repeated, substituting 20 ml. of Et$_3$Al for the 20 ml. of i-Bu$_3$Al and ethylene for isobutylene.

Ethylene and hydrogen are fed in a molar ratio of 2.5:1 in accordance with Formulas I and V and Table I and II. Similar desirable results are obtained.

EXAMPLE VIII

Example VII is repeated at temperatures ranging from 120–160° C. and pressures ranging from 600 p.s.i.g. to 2000 p.s.i.g., using ethylene/hydrogen molar feed ratios selected from Table II.

EXAMPLE IX

Example I is repeated, substituting 20 ml. of tri(2-ethyl-1-hexyl)aluminum for the 20 ml. of i-Bu$_3$Al and 2-ethyl-1-hexene for isobutylene.

2-ethyl-1-hexene and hydrogen are fed in a molar ratio of 8.9:1 in accordance with Formulas IV and V.

Similar desirable results are obtained.

EXAMPLE X

A 300-ml. stirred "Magne-Drive" autoclave is charged with 27 g. powdered Al, 0.3 g. Na, and 20 ml. of tristyryl-aluminum. The reactor is heated to 140° C. and pressured to 1000 p.s.i.g. with hydrogen. Then styrene and hydrogen are fed in a molar ratio calculated from Formula V so as to maintain the pressure constant at 1000 p.s.i.g.

Similar desirable results are obtained.

EXAMPLE XI

Prior examples are repeated with a system of triethyl aluminum, ethylene and cyclohexene. Similar desirable results are obtained.

EXAMPLE XII

Prior examples are repeated with other organo aluminum compounds and olefins listed in the foregoing. Similar desirable results are obtained.

What is claimed is:

1. In a process wherein an organo aluminum compound is produced by reacting aluminum, hydrogen and olefin in the presence of an organo aluminum compound, the improvement which comprises proportioning the olefin and the hydrogen mol feed ratio to about $$\frac{2}{1-\left[\frac{2MP}{3dRT}\right]}$$

where:

P=partial pressure of H$_2$ (p.s.i.a.)
T=temperature (° K.)
M=molecular weight of aluminum trialkyl product gr./mole
d=density of aluminum trialkyl product grams/milliliter
R=gas constant=1209.8 p.s.i.g.-ml./° K.-mol.

2. The process of claim 1 wherein the organo aluminum compound produced is triethyl aluminum, the olefin is ethylene and the value of 2M/3dRT is 0.201×10$^{-3}$.

3. The process of claim 1 wherein the organo aluminum compound produced is triisobutyl aluminum, the olefin is isobutylene and the value of 2M/3dRT is 0.413×10$^{-3}$.

4. The process of claim 1 wherein the organo aluminum compound produced is trihexyl aluminum, the olefin is hexene-1, and the value of 2M/3dRT is 0.494×10$^{-3}$.

5. The process of claim 1 wherein the organo aluminum compound produced is a tri- normal alkyl alkyl aluminum of 3–30 carbon atoms per alkyl radical, the olefin is a vinyl olefin having 2–30 carbon atoms per molecule and the value of 2/3dRT is $$\frac{0.201 \times 10^{-3}}{114}$$

6. The process of claim 1 wherein the organo aluminum compound produced is a tri- branched or cyclic alkyl alkyl aluminum of 5–30 carbon atoms per alkyl group, the olefin is a branched or cyclic olefin having up to about 30 carbon atoms per molecule, and the value of 2/3dRT is $$\frac{0.413 \times 10^{-3}}{198}$$

7. The process of claim 1 wherein the organo aluminum compound produced is trialkyl alkyl aluminum of 3 to 6 carbon atoms per alkyl radical, the olefin is an olefin having 3–6 carbon atoms per molecule, and the value of 2/3dRT is $$\frac{0.201 \times 10^{-3}}{114}$$

8. In a process wherein an organo aluminum compound is produced by reacting aluminum, hydrogen and olefin in the presence of an organo aluminum compound, the improvement which comprises proportioning the olefin and the hydrogen feed mol ratio from about 10 percent below to about 10 percent above, the following relationship:

$$\frac{2}{1-\left[\frac{2MP}{3dRT}\right]}$$

where:

P = partial pressure of $H_2$ (p.s.i.a.)
T = temperature (° K.)
M = molecule weight of aluminum trialkyl product gr./mole
d = density of aluminum trialkyl product grams/milliliter
R = gas content = 1209.8 p.s.i.g.-ml./° K.-mol.

9. In a process wherein an organo aluminum compound is produced by reacting aluminum, hydrogen and olefin in the presence of an organo aluminum compound, the improvement which comprises proportioning the olefin and the hydrogen feed mol ratio from about 5 percent below to about 5 percent above, the following relationship:

$$\frac{2}{1-\left[\dfrac{2MP}{3dRT}\right]}$$

where:

P = partial pressure of $H_2$ (p.s.i.a.)
T = temperature (° K.)
M = molecular weight of aluminum trialkyl product gr./mole
d = density of aluminum trialkyl product grams/milliliter
R = gas content = 1209.8 p.s.i.g.-ml./° K.-mol.

References Cited

UNITED STATES PATENTS

| | | | |
|---|---|---|---|
| 3,100,786 | 8/1963 | Fernald | 260—448 A |
| 3,259,644 | 7/1966 | Snyder | 260—448 A |
| 2,943,102 | 6/1960 | Balhoff | 260—448 A |
| 3,076,006 | 1/1963 | Kinter et al. | 260—448 A |

FOREIGN PATENTS

| | | | |
|---|---|---|---|
| 857,681 | 1/1961 | Great Britain | 260—448 A |
| 1,125,426 | 3/1962 | Germany | 260—448 A |

JAMES E. POER, Primary Examiner
H. M. S. SNEED, Assistant Examiner